(12) United States Patent
Antel et al.

(10) Patent No.: US 9,936,653 B2
(45) Date of Patent: Apr. 10, 2018

(54) IRRIGATION APPARATUS

(71) Applicant: Antelco Pty Ltd, Mile End (AU)

(72) Inventors: William Eric Antel, Mile End (AU); Lyall Causby, Mile End (AU); Robert Sigston, Mile End (AU); Malcom Fry, Mile End (AU)

(73) Assignee: ANTELCO PTY LTD, Mile End, SA (AU)

( * ) Notice: Subject to any disclaimer, the term of this patent is extended or adjusted under 35 U.S.C. 154(b) by 666 days.

(21) Appl. No.: 14/388,721

(22) PCT Filed: Mar. 28, 2013

(86) PCT No.: PCT/AU2013/000329
§ 371 (c)(1),
(2) Date: Sep. 26, 2014

(87) PCT Pub. No.: WO2013/142914
PCT Pub. Date: Oct. 3, 2013

(65) Prior Publication Data
US 2015/0088322 A1    Mar. 26, 2015

(30) Foreign Application Priority Data
Mar. 29, 2012   (AU) ................................ 2012901257

(51) Int. Cl.
*A01G 25/16*    (2006.01)
*G05B 11/01*    (2006.01)
(Continued)

(52) U.S. Cl.
CPC .............. *A01G 25/16* (2013.01); *A01G 25/06* (2013.01); *B05B 15/10* (2013.01); *F16K 27/00* (2013.01);
(Continued)

(58) Field of Classification Search
CPC ........ A01G 25/06; A01G 25/16; B05B 15/10; F16K 27/00; F16K 27/003; G05B 11/01; Y10T 137/0441
(Continued)

(56) References Cited

U.S. PATENT DOCUMENTS 1,664,909 A  *  4/1928  Thomson ................ F16K 11/20
                                                    137/613
2,598,961 A  *  6/1952  Andrus .................. A01G 25/02
                                                    137/883
(Continued)

FOREIGN PATENT DOCUMENTS

| AU | 2006200701 A1 | 9/2006 |
| EP | 2047741 A1 | 4/2009 |
| EP | 2308284 A1 | 4/2011 |

OTHER PUBLICATIONS

International Search Report and Written Opinion from corresponding International application No. PCT/AU2013/000329; dated Apr. 22, 2013; 10 pgs.

*Primary Examiner* — Ryan D. Coyer
(74) *Attorney, Agent, or Firm* — Haynes Beffel & Wolfeld LLP; James F. Hann; Andrew L. Dunlap (57) ABSTRACT

A valve body for an irrigation system is disclosed. The valve body is formed as a unitary molding and comprises a manifold arrangement integrally formed in the valve body and includes an inlet and at least one outlet. The manifold arrangement includes a valve receiving region located between the inlet and each outlet where each valve receiving region is operable to receive a valve to selectively control the flow of liquid between the inlet and each respective outlet of the manifold arrangement.

14 Claims, 6 Drawing Sheets

(51) Int. Cl.
 B05B 15/10 (2006.01)
 F16K 27/00 (2006.01)
 G05D 11/00 (2006.01)
 A01G 25/06 (2006.01)

(52) U.S. Cl.
 CPC ............ F16K 27/003 (2013.01); G05B 11/01 (2013.01); *Y10T 137/0441* (2015.04)

(58) Field of Classification Search
 USPC ........................................................ 700/284
 See application file for complete search history.

(56) References Cited

U.S. PATENT DOCUMENTS

| | | | | |
|---|---|---|---|---|
| 4,212,517 | A | * | 7/1980 | Fujii ........................ G02B 9/46 359/763 |
| 5,135,168 | A | | 8/1992 | Wang |
| 5,234,032 | A | * | 8/1993 | Kline ................. B60H 1/00642 137/884 |
| 5,253,807 | A | * | 10/1993 | Newbegin ............ A01G 25/023 239/11 |
| 5,685,164 | A | * | 11/1997 | Gardner ................ F16K 27/003 137/297 |
| 5,746,250 | A | | 5/1998 | Wick |
| 6,003,783 | A | * | 12/1999 | Hunter ................... A01G 25/06 239/200 |
| 6,199,580 | B1 | | 3/2001 | Morris |
| 2001/0045230 | A1 | * | 11/2001 | Olson .................... A01G 25/16 137/363 |
| 2007/0194150 | A1 | | 8/2007 | Ericksen et al. |
| 2011/0180159 | A1 | | 7/2011 | Ericksen et al. |
| 2012/0025116 | A1 | | 2/2012 | Murakami et al. |

\* cited by examiner

IRRIGATION APPARATUS

PRIORITY DOCUMENTS

The present application claims priority from Australian Provisional Patent Application No. 2012901257 titled "IRRIGATION APPARATUS" and filed on 29 Mar. 2012. The content of this application is hereby incorporated by reference in its entirety.

TECHNICAL FIELD

The present invention relates to irrigation. In a particular form, the present invention relates to an irrigation valving system.

BACKGROUND

An automated irrigation system typically incorporates a programmable electronic controller and an irrigation valving system that is controllable by the electronic controller to selectively distribute water from one or more outlets employing electronic solenoid valves whose operation is controlled by the electronic controller. Connected to the one or more outlets are individual hoses or pipes that distribute water in turn to various sprinklers, drippers and other irrigation apparatus forming part of the system.

The irrigation valving system, or "valve box" as it is known in the art, may be constructed in a number of different ways each involving a number of individual components and fittings. In one example, a manifold may be constructed from a single pipe portion having an inlet, terminated at the other end and further including at least one outlet connection fitting. Connected to each outlet fitting is a further pipe or hose section incorporating an electronic solenoid valve operative to selectively control the flow of water through the respective pipe or hose section. Typically, this section will have a further fitting to which a pipe or hose connector may be attached to.

In another example, the manifold may be made of a number of T-piece connectors or pipe sections that are attached together to form an arrangement having a single inlet and multiple outlets to each of which a further pipe or hose section incorporating an electronic solenoid valve is attached to. Commonly, an open bottomed box having a removable lid is placed on top of the manifold with the various inlet and outlet pipes extending out beneath the bottom of the box for connection to the irrigation system. In addition, wiring or cabling originating from the electronic controller is connected to each of the solenoid valves.

A disadvantage of these arrangements is that multiple different components are required to be assembled together which is both complex and time consuming, typically requiring the assistance of a professional installer even for domestic irrigation systems. This adds unnecessary expense to these systems. One attempt to address this problem is for a manufacturer to assemble the multiple manifold components into a valve box according to a user's requirements. However, this approach relies on their being an accurate specification of the required manifold arrangement in the first place and does not allow a user to easily modify the preassembled valve box. In addition, the reduction in expense is minimal. A further disadvantage of these arrangements is that the multiple connections result in an increased likelihood of water leaks forming in the system resulting in significant wastage of water and the requirement for regular maintenance.

There is thus a need for a valving arrangement for an irrigation system, and in particular for domestic irrigation systems, that is capable of being readily and reliably assembled.

SUMMARY

In a first aspect the present invention accordingly provides a valve body for an irrigation system, the valve body formed as a unitary moulding and comprising:

a manifold arrangement integrally formed in the valve body and including an inlet and at least one outlet, wherein the manifold arrangement includes a valve receiving region located between the inlet and each outlet, each valve receiving region operable to receive a valve to selectively control the flow of liquid between the inlet and each respective outlet of the manifold arrangement.

In another form, the inlet includes an integrally moulded connection region for connection of a hose or pipe to the inlet.

In another form, the integrally moulded connection region is a male threaded connector.

In another form, the at least one outlet includes an integrally moulded connection region for connection of a hose or pipe to the outlet.

In another form, the integrally moulded connection region is a male threaded connector.

In another form, the valve body includes integrally formed sidewalls extending upwardly from the manifold arrangement.

In another form, the valve body includes a sidewall attachment, attachable to the valve body and forming sidewalls extending upwardly from the manifold arrangement.

In another form, the valve body further includes a lid adapted to be mounted to the sidewalls to protect the valve receiving region.

In another form, the lid is tiltably mounted to valve body to the sidewalls to allow access to the valve receiving region.

In a second aspect aspect the present invention accordingly provides a valve box including a valve body according to a first aspect of the present invention and at least one valve installed in the at least one valve receiving region.

In another form, the at least one valve is a solenoid valve configured to be controlled by an irrigation electronic controller.

In a third aspect the present invention accordingly provides an irrigation system including a valve box according to a second aspect of the present invention connected to a water supply at the inlet and having an irrigation apparatus connected to the at least one output.

In a fourth aspect the present invention accordingly provides a valve body for an irrigation system, the valve body including an integrally moulded feeder fluid passageway connectable to a liquid supply and one or more integrally moulded distribution fluid passageways extending from the feeder fluid passageway to distribute liquid from the valve body, wherein the valve body includes a valve receiving region for each distribution fluid passageway operable to receive a valve to selectively control the flow of liquid through the distribution fluid passageway.

In another form, the feeder fluid passageway terminates within the valve body.

In another form, the feeder fluid passageway extends through the valve body and includes a connection region at its end to allow termination of the feeder fluid passageway or connection of another component of the irrigation system.

In a fifth aspect the present invention accordingly provides a method for assembling an irrigation system incorporating a valve body, the valve body formed as a unitary moulding and comprising a manifold arrangement integrally formed in the valve body and including an inlet and at least one outlet, wherein the manifold arrangement includes a valve receiving region located between the inlet and each outlet, the method including:

connecting the inlet to a water supply;

connecting the at least one outlet to an irrigation apparatus;

installing a valve in each valve receiving region the valve operable to selectively control the flow of water between the inlet and the at least one outlet; and connecting the valve to an irrigation controller.

BRIEF DESCRIPTION OF DRAWINGS

Illustrative embodiments of the present invention will be discussed with reference to the accompanying drawings wherein.

In the following description, like reference characters designate like or corresponding parts throughout the figures.

DESCRIPTION OF EMBODIMENTS

Referring now to FIGS. 1 to 5, there are shown various views of a valve body 100 for an irrigation system according to an illustrative embodiment of the present invention. In this illustrative embodiment, valve body 100 is for a domestic water irrigation but equally valve body 100 may be applicable to other types of irrigation systems or liquid distribution systems involving the controllable distribution of liquid from an inlet to multiple outlets. Valve body 100 is formed as a unitary moulding which in this illustrative embodiment is constructed by injection moulding employing an engineering grade plastic material such as glass filled nylon or the like.

Valve body 100 includes a manifold arrangement 150 integrally formed into the valve body 100 and having an inlet 110 and four outlets 120. In this illustrative embodiment, manifold arrangement includes a feeder channel or conduit 151 functioning as integrally moulded feeder fluid passageway and extending through and terminating within valve body 100 with four distribution channels or conduits 152 functioning as integrally moulded distribution fluid passageways each extending from feeder channel 150 through valve body 100 and exiting valve body 100 at respective outlets 120. In this illustrative embodiment, feeder channel 151 extends through the centre of valve body 100 having two opposed pairs of distribution channels 152 each extending perpendicularly from feeder channel 151. Other manifold arrangements are of course possible, including but not limited to, a feeder channel extending through one side of valve body 100 with at least one distribution channel extending through valve body 100 to a respective outlet on the other side of the valve body. In yet other embodiments, there may be 1, 2, 3, 4, 5, 6, 7, 8, 9, 10 or more distribution channels extending from feeder channel. Furthermore, the distribution channels may be sized differently according to the flow requirements of the particular feeder channel. In yet another embodiment, the feeder channel extends through valve body 100 and includes a connection region at its end to allow termination externally to valve body 100 or alternatively connection to a further component of the irrigation system such as a further valve body in accordance with the present invention.

In this illustrative embodiment, inlet 110 and each of the outlets 120 include integrally formed connection regions 111, 121 in the form of a ¾" British Standard Pipe (BSP)/National Pipe Thread (NPT) male thread for the inlet 110 and ¾" BSP/NPT male threads for outlets 120. As would be appreciated by those of ordinary skill in the art, connection regions 111, 121 may be implemented in a variety of forms and sizes, including but not limited to, a threaded female region, an extension portion for connection to a garden type quick release connector, a clamping region for attachment of a hose clamp, one or more bayonet extensions for attachment of a bayonet fitting, a compression fitting arrangement or any combination of the above as required.

Figure 2:
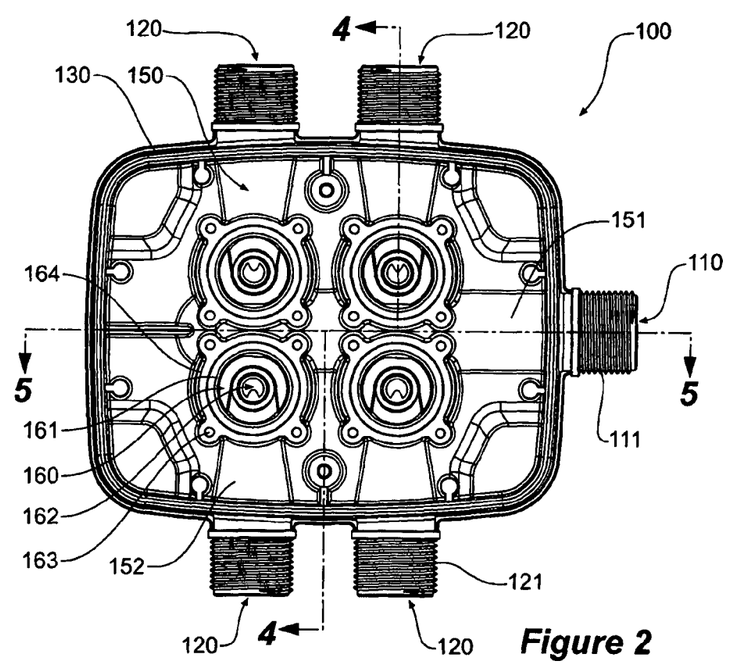
FIG. 2 is a top view of the valve body illustrated in FIG. 1.
Figure 3:
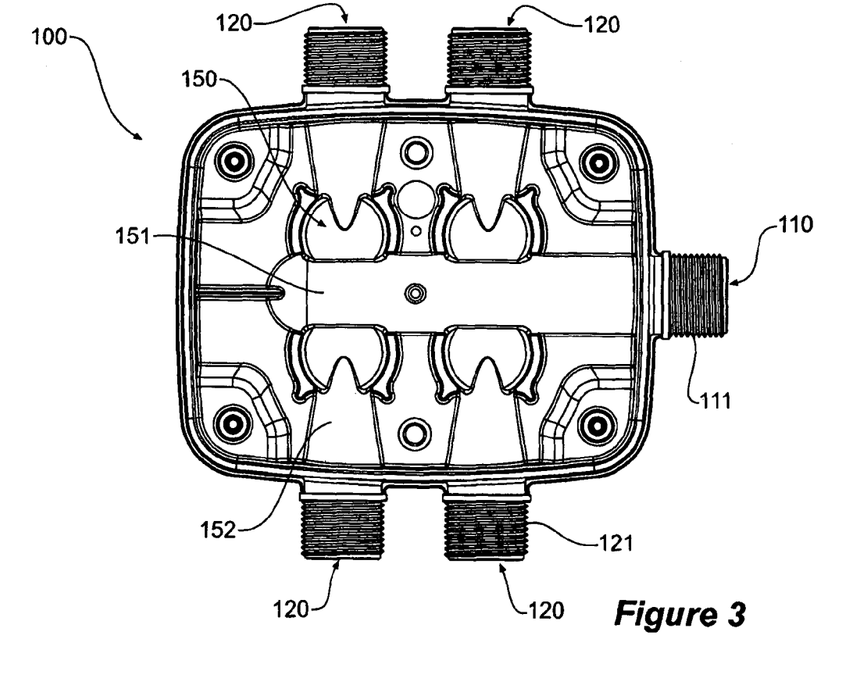
FIG. 3 is a bottom view of the valve body illustrated in FIG. 1.
Figure 4:
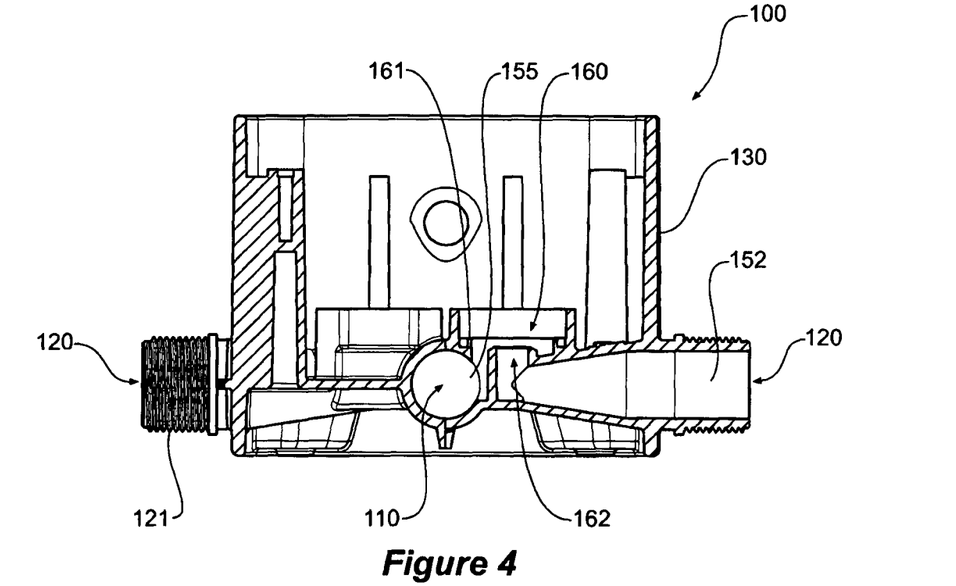
FIG. 4 is a first side sectional view through 4-4 of the valve body illustrated in FIG. 2.
Figure 5:
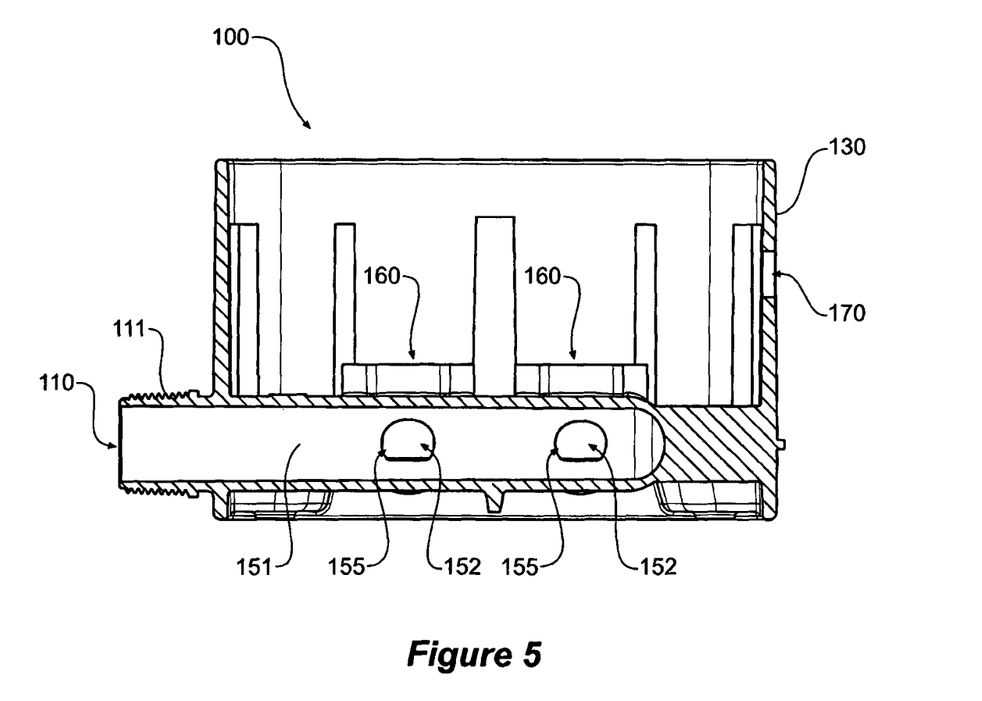
FIG. 5 is a second side sectional view through 5-5 of the valve body illustrated in FIG. 2.

Valve body 100 further includes a valve receiving region 160 located between inlet 110 and each outlet 120, In this illustrative embodiment, each valve receiving region 160 is located in respective distribution channel 152 abutting feeder channel 151 and includes a circular valve seat portion 161 and a valving chamber 162 located at the entrance 155 of each respective distribution channel (as best shown in FIG. 4). Valve receiving region 160 further includes four threaded apertures 163 configured in a square arrangement about the upper rim 164 of valve receiving region 160 (as best shown in FIG. 2). Valve chamber 162 is configured to receive a valve plunger or sealing member to prevent the flow of water from feeder channel 151 through distribution channel 152 and out outlet 120.

Valve body 100 in this illustrative embodiment further includes an integrally formed peripheral web 130 extending upwardly from the base of valve body and forming protective side walls about the valve receiving regions 160. These protective side walls allow the valve body to be buried within the ground if required.

Figure 6:
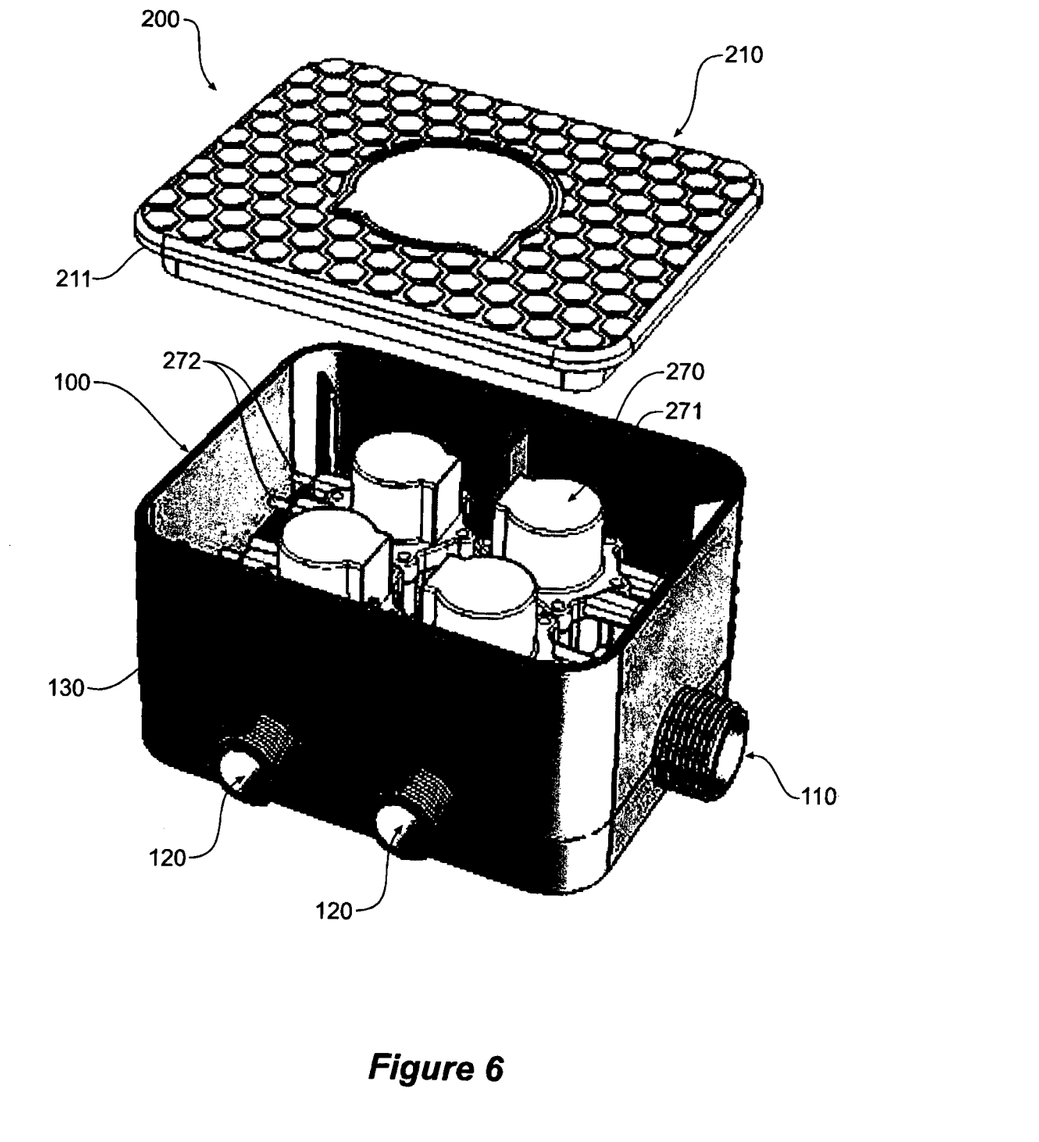
FIG. 6 is a an exploded view of a valve box including the valve body illustrated in FIG. 1.

Referring now to FIG. 6, there is shown a valve box or housing 200 incorporating valve body 100 with its integrally formed side walls 130, four solenoid valves 270 each secured to valve body 100 by mounting screws 271 and lid 210 which includes peripheral rim region 211 that seats on sidewall 130. In other embodiments, lid 210 may be mounted to side walls by an appropriate hinging arrangement which allows lid 210 to be tiltably lifted from valve body 100. In this illustrative embodiment, lid 210 is injection moulded from a polypropylene material. However, other thermoplastic or plastic materials may be used depending on requirements.

Figure 1:
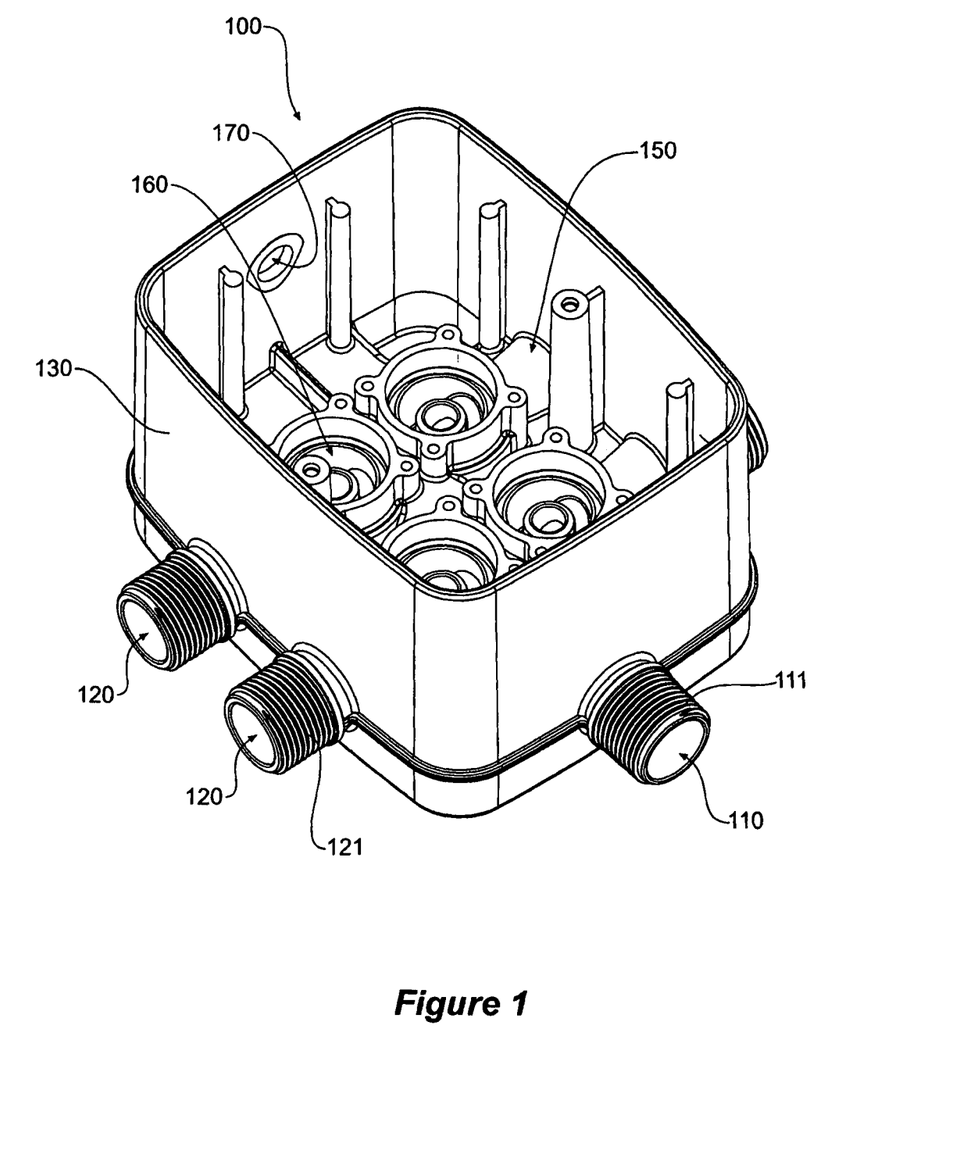
FIG. 1 is a top perspective view of a valve body in accordance with a first illustrative embodiment of the present invention.

To install valve box 200, electric cabling (not shown) is connected at one end to the electrical connectors 272 of each solenoid valve 270, through access aperture 170 in side wall 130 (as best seen in FIG. 1) and at the other end to an irrigation electronic controller which functions to send timed electrical signals to actuate the solenoid valves 270. Typically, a multi-strand cable having individual wires for each connector is employed between valve box 200 and electronic controller. In this illustrative embodiment, each solenoid valve 270 includes a spade terminal connector but equally the solenoid valve 270 may be controlled by an input cable which is in turn connected to the cabling from the irrigation electronic controller.

A hose or pipe from a water source is connected to inlet 110 of the manifold arrangement 150 of valve body 100 and further hoses or pipes are connected to each outlet 120, these hoses in turn supplying various irrigation apparatus such as sprinklers, drippers and the like. In this manner, each solenoid valve 270 is activated by irrigation controller which on activation inserts a plunger or sealing member into the respective valve chamber 162 of the solenoid valve to stop the flow of water from feeder channel 151 to outlet 120. On de-activation, the plunger member of solenoid valve retracts to allow water to flow out of respective outlet 120. In another illustrative embodiment, the feeder channel may include its own valve receiving region located prior to the distribution channels to receive a solenoid valve or similar to function as an override valve for the valve body 100.

While in this illustrative embodiment, a solenoid valve is employed it would be apparent to those of ordinary skill in the art that other suitable electromechanical valves and complementary shaped valve receiving regions formed in valve body 100 are considered to be within the scope of the invention.

In those instances where three or less of the distribution channels 152 are required, a plug arrangement may substituted for a solenoid valve 270 in valve receiving region 160 with the plug arrangement functioning to permanently seal the respective valve chamber 162. Where a solenoid valve 270 has already been installed in a particular distribution channel 152, an end cap can also be applied to the respective outlet 120 if it is no longer required.

As would be appreciated by those of ordinary skill in the art, the use of valve body 100 simplifies the assembly of an irrigation system and in particular the assembly of the manifold arrangement whereby a single source of water is distributed to multiple hoses or pipes using multiple valves. By incorporating the manifold arrangement within a unitary moulding, which also functions to receive the valves, the number of interconnecting parts is reduced markedly when compared to prior art arrangements. This not only has the effect of reducing the time and level of expertise required to install and configure a valve box, but it also greatly reduces the number of connections and hence the likelihood of leaking or a connector failing, thereby increasing the reliability of the valve box 200 incorporating valve body 100. Where a protective housing is required, valve box 100 by virtue of its integrally formed side walls 130 also further reduces the number of separate components while providing effective protection.

Figure 7:
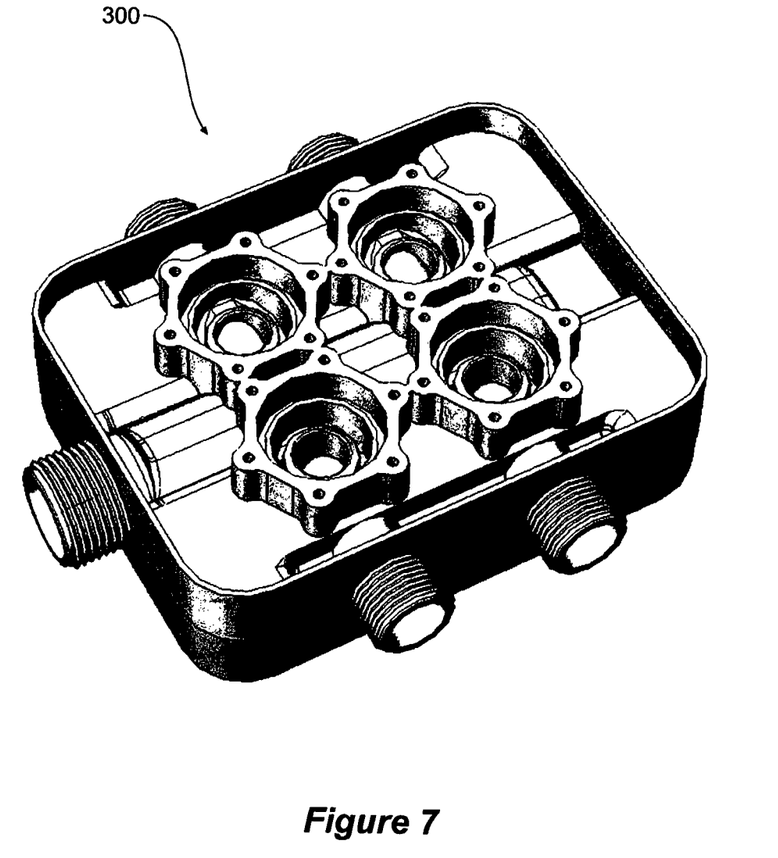
FIG. 7 is a top perspective view of a valve body in accordance with a second illustrative embodiment of the present invention.
Figure 8:
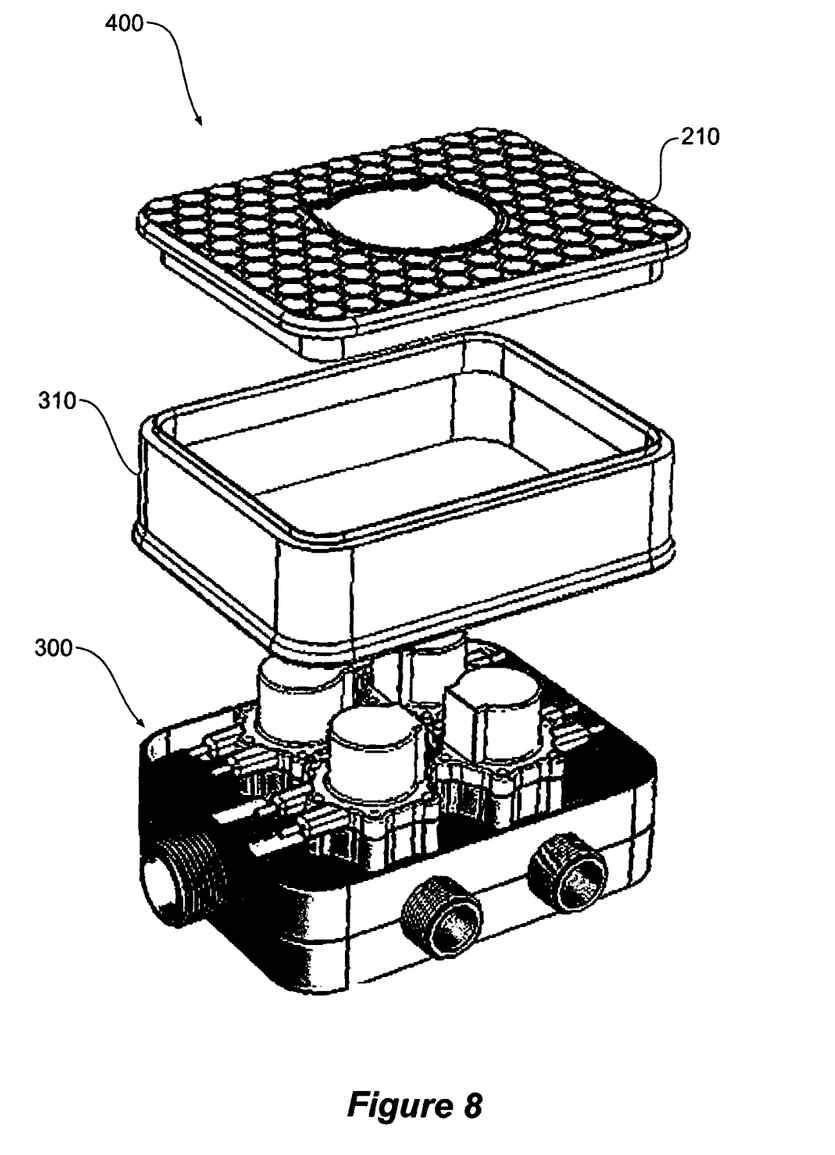
FIG. 8 is a side perspective view of a valve box including the valve body illustrated in FIG. 7.

Referring now to FIG. 7, there is shown a valve body 300 according to a second illustrative embodiment of the invention. Valve body 300 is essentially identical in functionality to valve body 100 except that it does not include integrally formed sidewalls. This embodiment may be used in those circumstances where a protective housing is not required such as where climactic conditions are suitable or the valve body is itself under cover. As shown in FIG. 8, a separate sidewall attachment 310 and lid 210 may be combined with valve body 300 to form a valve box 400 similar to valve box 200 if required. Further extension sidewall attachments may be added to allow valve box 400 to be buried deeper into the soil if required.

For those valve bodies where the feeder channel extends through the valve body, two or more valve bodies in accordance with the present invention may be connected together in series to provide additional outlets as required.

In other embodiments, the valve body may be adapted to be wall mounted.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A valve body for an irrigation system, the valve body formed as a unitary moulding and comprising:
a manifold arrangement integrally formed in a base of the valve body and extending through the base of the valve body, the manifold arrangement including a single inlet and a plurality of outlets located on the periphery of the base of the valve body, wherein the manifold arrangement includes a valve receiving region located between the single inlet and each of the plurality of outlets, each valve receiving region operable to receive a valve to selectively control the flow of liquid between the single inlet and each respective outlet of the manifold arrangement, wherein the valve body includes integrally formed sidewalls extending upwardly from the manifold arrangement to in use form a protective wall that surrounds any valves received in the respective valve receiving regions.

2. The valve body of claim 1, wherein the single inlet includes an integrally moulded connection region for connection of a hose or pipe to the inlet.

3. The valve body of claim 2, wherein the integrally moulded connection region is a male threaded connector.

4. The valve body of claim 1, wherein at least one outlet of the plurality of outlets includes an integrally moulded connection region for connection of a hose or pipe to the outlet.

5. The valve body of claim 4, wherein the integrally moulded connection region is a male threaded connector.

6. The valve body of claim 1, further including a lid adapted to be mounted to the protective wall to further protect the valve receiving region.

7. The valve body of claim 6, wherein the lid is tiltably mounted to the protective wall to allow access to the valve receiving region.

8. A valve box including the valve body of claim 1 and at least one valve installed in at least one of the valve receiving regions.

9. The valve box of claim 8, wherein the at least one valve is a solenoid valve configured to be controlled by an irrigation electronic controller.

10. An irrigation system including the valve box of claim 8 connected to a water supply at the inlet and having an irrigation apparatus connected to the at least one of the plurality of outputs.

11. A valve body for an irrigation system, the valve body formed as a unitary moulding, the valve body including a single integrally moulded feeder fluid passageway connectable to a liquid supply and one or more integrally moulded distribution fluid passageways extending through a base of the valve body from the single feeder fluid passageway to distribute liquid from the valve body through a plurality of outlets located on the periphery of the base of the valve body, wherein the valve body includes a valve receiving region for each distribution fluid passageway operable to receive a valve to selectively control the flow of liquid through each respective distribution fluid passageway, wherein the valve body includes integrally formed sidewalls extending upwardly from the base of the valve body to in use form a protective wall that surrounds any valves received in the respective valve receiving regions.

12. The valve body of claim 11, wherein the single feeder fluid passageway terminates within the valve body.

13. The valve body of claim 11, wherein the single feeder fluid passageway extends through the valve body and includes a connection region at its end to allow termination of the feeder fluid passageway or connection of another component of the irrigation system.

14. A method for assembling an irrigation system incorporating a valve body, the valve body formed as a unitary moulding and comprising a manifold arrangement integrally formed in a base of the valve body and extending through the base of the valve body, the manifold arrangement including a single inlet and a plurality of outlets located on the periphery of the base of the body, wherein the manifold arrangement includes a valve receiving region located between the single inlet and each of the plurality of outlets, and wherein the valve body includes integrally formed sidewalls extending upwardly from the manifold arrangement to in use form a protective wall that surrounds any valves received in the respective valve receiving regions, the method including:
  connecting the inlet to a water supply;
  connecting the at least one outlet to an irrigation apparatus;
  installing at least one valve in a respective valve receiving region the valve operable to selectively control the flow of water between the single inlet and at least one outlet of the plurality of outlets; and
  connecting the valve to an irrigation controller.

* * * * *